United States Patent [19]

Band

[11] Patent Number: 4,931,097

[45] Date of Patent: Jun. 5, 1990

[54] PROCESS FOR PREPARING ACTIVATORS FOR FAST-SETTING CEMENTS

[75] Inventor: Elliot I. Band, Tarrytown, N.Y.

[73] Assignee: Rhone-Poulenc Basic Chemicals Co., Shelton, Conn.

[21] Appl. No.: 12,582

[22] Filed: Feb. 9, 1987

Related U.S. Application Data

[63] Continuation-in-part of Ser. No. 787,558, Oct. 15, 1985, abandoned.

[51] Int. Cl.$^5$ .................. C04B 7/00; C04B 9/00; C04B 11/00; C04B 1/00
[52] U.S. Cl. ................... 106/672; 106/803; 106/811; 106/681; 106/638
[58] Field of Search ............ 502/214, 412; 106/85, 106/121; 501/111; 427/372.2, 443.2, 215; 428/403, 704

[56] References Cited

U.S. PATENT DOCUMENTS

| | | | |
|---|---|---|---|
| 3,202,520 | 8/1965 | Enoch | 106/85 |
| 3,475,188 | 10/1969 | Woodhouse et al. | 501/111 |
| 3,525,632 | 8/1970 | Enoch | 106/85 |
| 3,673,111 | 6/1972 | Hovarth | 502/213 |
| 3,821,006 | 6/1974 | Schwartz | 106/85 |
| 3,879,209 | 4/1975 | Limes et al. | 106/85 |
| 3,892,577 | 7/1975 | Sugahara et al. | 106/18.14 |
| 3,900,331 | 8/1975 | Cassidy | 106/85 |
| 4,059,455 | 11/1977 | Limes et al. | 106/85 |
| 4,174,227 | 11/1979 | Tomic | 106/85 |
| 4,440,865 | 4/1984 | Salazar | 501/95 |
| 4,454,241 | 6/1984 | Pine et al. | 502/214 |
| 4,505,752 | 3/1985 | Sherif et al. | 106/85 |
| 4,755,227 | 7/1988 | Sherif et al. | 106/85 |

*Primary Examiner*—William R. Dixon, Jr.
*Assistant Examiner*—Alan A. Wright
*Attorney, Agent, or Firm*—Paul J. Juettner

[57] ABSTRACT

A particulate solid activator comprising a porous material containing absorbed ammonium phosphate can be prepared by a process which comprises: heating a slurry of the porous material and an ammonium phosphate solution; and then spray drying the slurry to obtain the particulate solid activator. The porous material can be diatomaceous earth. The resulting particulate solid activator can be dry blended with a magnesium-containing compound, e.g. MgO, and an optional aggregate to form a magnesium phosphate fast-setting cement mixture. This mixture reacts in the presence of an aqueous component at ambient temperature to form a monolithic solid.

3 Claims, No Drawings

PROCESS FOR PREPARING ACTIVATORS FOR FAST-SETTING CEMENTS

CROSS REFERENCE TO RELATED APPLICATION

This application is a continuation-in-part of U.S. application Ser. No. 787,558, filed Oct. 15, 1985 now abandoned.

BACKGROUND OF THE INVENTION

1. Field of the Invention

This invention relates to fast-setting magnesium phosphate cements. More particularly, it relates to an improved process for the preparation of a particulate solid activator comprising a porous material containing absorbed ammonium phosphate which, when admixed with MgO, reacts in the presence of an aqueous component at ambient temperatures to form a magnesium phosphate fast-setting cement.

2. Related Developments

Cementitious compositions which set in a short period of time and prepared by mixing a magnesium-containing component with a $P_2O_5$ material and an optional aggregate are popular for use in repairing or patching cracks, holes and spalled areas of highways, airfield pavements and bridge decks, as well as for a variety of commercial and industrial applications.

U.S. Pat. No. 3,202,520 (Enoch, Aug. 8, 1965) discloses a rapid set non-hygroscopic cement composition consisting essentially of a blend of a phosphate derived from phosphoric acid and of alumina, and containing from 15 to 55 weight percent of $P_2O_5$, from 45 to 75 weight percent of alumina, and from 5 to 18 weight percent of magnesium oxide. The phosphoric acid and alumina are blended at room temperature, with the alumina added to the liquid phosphoric acid. The resultant mixture is dried above 100° C. for a sufficient time to remove all moisture. The resulting dried material is milled to pass through a 325 mesh screen prior to being dry blended with the MgO.

U.S. Pat. No. 3,525,632 (Enoch, Aug. 25, 1970) discloses a rapid setting concrete cement composition which comprises dry blending magnesium-containing compounds, aluminum-containing compounds and phosphorus-containing compounds from stated sources, in stated weight percentages, and then pulverizing the blended material without a separate drying stage. The phosphorus-containing compound is a mixture derived from phosphoric acid, and at least 50 weight percent of one of trimagnesium phosphate, aluminum orthophosphate, and phosphoric anhydride. This reference states that the compositions of U.S. Pat. No. 3,202,520 (discussed above), which require a drying step to remove moisture, resulted in an increased cost. This drying step is carried out in expensive stainless steel equipment to avoid corrosion and contamination problems. Further, during drying, there is a pronounced tendency for the mixture to cake within the dryer causing serious production problems.

U.S. Pat. No. 3,879,209 (Limes et al., Apr. 22, 1975) discloses a process for a fast-setting concrete comprising establishing a mixture for an aggregate, containing at least 10 percent by weight of magnesia, and ammonium phosphates in aqueous solution. This patent discloses that a commercial agricultural fertilizer product known as sequestered phosphatic solution (SPS) is particularly suitable as a source of the ammonium phosphate. No separate drying of the SPS is disclosed in this reference.

U.S. Pat. No. 4,059,455 (Limes et al., Nov. 22, 1977) discloses a process for making a fast-setting concrete comprising establishing a mixture of an aggregate, containing at least 1 percent magnesia, and ammonium phosphates in aqueous solution. No separate drying of the ammonium phosphate solution is disclosed in this reference.

U.S. Pat. No. 4,174,227 (Tomic, Nov. 13, 1979) discloses a grouting system comprising an acidic reactive component comprising at least one acidic oxyphosphorus compound selected from phosphoric acids, anhydrides of phosphoric acids and salts of phosphoric acids with multivalent metal cations, and a basic reactive component comprising at least one basic metal compound of a Group II or Group III metal capable of reacting with the oxy-phosphorous compound(s) in the presence of water to form a monolithic solid. This reference does not disclose a separate drying step for the acidic reactive component.

U.S. Pat. No. 3,821,006 (Schwartz, June 28, 1974) discloses a patching composition consisting essentially of a reactive component of MgO with an acid phosphate salt and an inert aggregate component. The particle size of the inert aggregate component is related to the compressive strength of the cement formed at an early cure age. This reference does not disclose a separate drying step for the acidic component.

The mixtures employed in the methods of the references discussed above, set and develop usable strength much more rapidly than conventional materials. Nonetheless, each of these references is limited, as discussed above, and therefore distinguishable from the process of the present invention in several ways.

U.S. Pat. No. 3,673,111 (Hovarth, June 27, 1972) discloses a process for manufacturing a solid phosphoric acid catalyst in which a siliceous adsorbent is admixed with a polyphosphoric acid. The mixture is heated at an elevated temperature and thereafter extruded. The extrudate is further treated by drying first in a steam atmosphere and then in a dry air atmosphere. This reference does not teach a process for producing solid $P_2O_5$ material suitable for use in fast-setting cements but rather teaches a process for making a catalyst.

U.S. Pat. No. 3,475,188 (Woodhouse et al., Oct. 28, 1969) discloses a dry refractory composition consisting essentially of phosphates absorbed on diatomaceous earth, up to 80 percent by weight being absorbed thereon, magnesium oxide and refractory aggregate. Compositions and processes in which well above 80 percent by weight of phosphates absorbed on diatomaceous earth are present would be advantageous but are not contemplated by this reference. A separate drying step for the phosphates absorbed on diatomaceous earth is also not disclosed. This reference is directed to the refractory arts wherein curing at high temperatures of the phosphate/MgO blend is contemplated before substantial compressive strength develops. The invention, in contrast, is directed to the fast-setting magnesium phosphate cement art wherein the phosphate/MgO blend reacts at ambient temperatures in the presence of an aqueous component to yield substantial compressive strengths shortly after hydration.

U.S. patent application Ser. No. 788,664, filed Oct. 17, 1985, discloses a particularly effective solid phosphorus pentoxide material suitable for use in fast-setting magnesium phosphate cements. This material is prepared by a process which comprises mixing a porous material with a liquid phosphorus pentoxide material and heating the mixture until a dry solid is produced. This solid phosphorus pentoxide material can then be dry blended with a solid component comprising magnesium oxide, magnesium hydroxide, magnesium carbonate or mixtures thereof. An aggregate can optionally be added to this dry blend. When hydrated, this dry blend has been found to be particularly advantageous as a fast-setting magnesium phosphate cement. An aqueous solution of ammonium phosphate has been found to be particularly advantageous when used as the phosphorus pentoxide material that is mixed with the porous material. Heating this mixture of ammonium phosphate and the porous material to form a dry solid can yield inconsistent results, e.g., the drying time can be extremely long and/or the resulting dry solid can be difficult or even incapable of being milled to a preferred mesh size.

U.S. patent application Ser. No. 735,907, filed by Tieckelmann et al., May 20, 1985, discloses an improved process for drying ammonium phosphate solution absorbed onto porous material which comprises adding an effective amount of an acid, preferably orthophosphoric acid, to the solution prior to the drying step. The improvement comprises a substantial shortening of the drying time. The resulting dry activator can be used in fast-setting magnesium phosphate cements.

A process for improving this drying process while maintaining the advantages of these particular compositions of magnesium phosphate fast-setting cements would be advantageous.

SUMMARY OF THE INVENTION

An object of this invention is to provide a process for preparing improved magnesium phosphate fast-setting cements and in particular a process for improving the drying and milling of a mixture of a porous material and an ammonium phosphate solution. It is a further object of this invention to ensure that the dried $P_2O_5$ material absorbed on porous material is a preferred mesh size.

Other objects and advantages of the present invention are described elsewhere within this specification.

In accordance with the present invention a process for preparing a particulate solid activator comprising a porous material containing absorbed ammonium phosphate has now been discovered, said process comprises: (a) heating a slurry of the porous material and an ammonium phosphate solution; and then (b) spray drying said slurry to obtain said particulate solid activator. The slurry is heated in step (a) from about 30° C. to about 120° C. for from about 6 hours to about 192 hours. In this process, a preferred porous material is diatomaceous earth.

DETAILED DESCRIPTION OF THE INVENTION

Novel, dry, fast-setting magnesium phosphate cementitious compositions have previously been disclosed in U.S. patent application Ser. No. 788,664, filed Oct. 17, 1985. These compositions generally comprise two essential constituents: a solid activator and a magnesium-containing component. The solid activator constituent is a composite comprising a $P_2O_5$ material absorbed onto a porous material. This activator can be prepared by mixing a porous material with a liquid phosphorus pentoxide material then heating the mixture until a dry solid is produced. The dry solid is then milled. An aqueous solution of sequestered ammonium phosphate fertilizer is the preferred $P_2O_5$ material. This invention discloses an improved process for preparing a particulate solid activator containing an aqueous $P_2O_5$ material and particularly the preferred sequestered ammonium phosphate fertilizer.

The term "$P_2O_5$ material" is used throughout this specification to describe material containing phosphorus values. The phosphorus content of these materials is usually analyzed and expressed as $P_2O_5$, hence the term "$P_2O_5$ material".

The preferred ammonium phosphate solution useful in this invention is ammonium phosphate fertilizer solution. This fertilizer solution contains a mixture of orthophosphates and condensed phosphate species. In its original aqueous state, this fertilizer undergoes continuous hydrolysis while standing whereby the weight ratios of the different phosphate forms keep changing, usually from high polyphosphate and low orthophosphate contents to low polyphosphate and high orthophosphate contents as the fertilizer ages. The polyphosphates of this fertilizer solution can include pyro-, tri-, tetra-, etc. phosphate species. Because of this continuous hydrolysis, magnesium phosphate cements using liquid ammonium phosphate fertilizer by itself as the $P_2O_5$ component exhibit unpredictable qualities. Usually, when a fresh fertilizer solution is used by itself, the cement mixture does not set at all or only forms a weak cement, and when an older fertilizer solution is used, the cement sets very rapidly with little or no working time to apply the cement. Liquid fertilizer solution upon standing also precipitates hard to handle insolubles, and in cold weather the liquid freezes and gels creating more handling problems.

A particularly preferred fertilizer solution is Poly-N ® 10-34-0 ammonium phosphate solution supplied by Arcadian Corporation and used primarily as an agricultural fertilizer. A typical analysis of the Poly-N ® brand fertilizer shows 10.0 weight percent ammoniacal nitrogen and 34 weight percent total $P_2O_5$. Usually, 50 to 60 weight percent of the total $P_2O_5$ is polyphosphate. This commercial product contains approximately 2 weight percent of impurities, which do not adversely affect its use in preparing the solid particulate activator. The major impurities comprise approximately 0.5 weight percent iron, 0.5 weight percent sulfur, 0.2 weight percent magnesium (as MgO) and 0.15 weight percent of fluorine. This commercial product also contains approximately 50 weight percent water. Another preferred fertilizer solution is Poly-N ® 11-37-0 ammonium phosphate solution supplied by Arcadian Corporation.

Ammonium phosphate solutions containing from about 5 to about 50 and preferably from about 30 to about 40 weight percent of phosphates expressed as $P_2O_5$ can be used.

The porous material which can be employed in preparing the particulate activator of this invention includes diatomaceous earth, kieselguhr, artificially prepared porous silica, vermiculite, alumina and such naturally occurring substances as various fuller's earth and clays such as bentonite, montmorillonite, acid treated clays and the like. Each porous material which may be used will exert its own specific influence upon the solid particulate activator formed and the fast-setting cement resulting from the use of this activator will not necessarily be identical with that of other members of the class. The porous material can be inert or partially inert.

Members of the class of porous material can be used separately or in combination with each other.

A preferred porous material is diatomaceous earth. The highly porous diatomaceous earth can absorb much more than 80 percent by weight, based on the weight of diatomaceous earth, of the liquid ammomium phosphate solution, and absorption of 225 percent and above are preferred. Upon spray drying the diatomaceous earth with the preferred liquid ammonium phosphate solution, the solid particulate activator forms.

The diatomaceous earth can comprise from about 30 percent to about 90 percent by weight of the solid activator with about 30 percent to about 65 percent being preferred; can have a density of from 7.0–19.5 pounds per cubic foot (0.112–0.312 grams per cc); can have a water absorption value of from 170 percent to 255 percent by weight; and can have a surface area of from 1–100 $M^2/g$.

The liquid ammonium phosphate solution and the porous material is mixed at ambient temperatures to form an aqueous slurry. The amounts of ammonium phosphate solution and porous material used in this mixture are chosen to result in a dry solid particulate activator comprising from about 10 percent to about 70 percent by weight of the ammonium phosphate solution and from about 30 percent to about 90 percent by weight of the porous material in the resulting solid particulate activator. Additional water can be added to the slurried mixture to adjust the consistency of the slurry.

In this invention, the slurry formed above is subjected to a heating pre-treatment step prior to being dried. This heating step is preferably carried out in a closed vessel. The degree of heating is adjusted to a slurry temperature of from about 30° C. to about 120° C., with a temperature from about 75° C. to about below the boiling point of the slurry being preferred. This heating step is carried out for from about 6 hours to about 192 hours, with from about 36 hours to about 60 hours being preferred.

After the heating, pre-treatment step is completed, the slurry can now be dried to prepare therefrom the dry, particulate, solid activator.

The drying of the mixture of porous material and aqueous solution of ammonium phosphate to prepare the activator is a complicated step which involves the loss of water, the loss of ammonia, a drop in pH of the mixture and hydrolysis of the pyrophosphate species. In this drying step, water is normally driven off first, however, it has been found that the resulting material can have a sticky characteristic which creates fouling problems during milling. This fouling problem can be so severe as to render the material incapable of being milled. The pH of the mixture before drying is usually from about 5.0 to 7.0 and after drying is usually from about 4.0 to about 6.0. One attempt at solving this problem was to heat the sticky material further to reduce its stickiness. During this additional heating step, ammonia is driven off and the pH of the material usually falls to a range of from about 5.0 to about 5.5. This material that has been further heated is now capable of being milled. However, this additional drying step is expensive and the stickiness problem does not occur consistently, therefore process adjustments have to be made in an unscheduled manner.

The improved process of the present invention solves the problems outlined above in the preparation of the particulate, solid activator. Spray drying can obviate the need for a separate milling step. Prior to spray drying, the heat pre-treated slurry can again be adjusted with water to achieve a desirable consistency for efficient spray drying.

The activator of this invention prepared by spray drying collects primarily as a dry powder on the walls of the drying chamber or as a very fine powder in the collection vessel, depending upon the particular materials used in the process. An ideal activator is one which spray dries easily, passing through the cyclone into the receiver; is a uniform flowable powder; provides a strong cement of about 4000 psi compressive strength after 2 hours with reasonable initial setting time of about 10 minutes and an exotherm of about 80° C.; and is formulated with relatively inexpensive ingredients.

When spray drying is compared to other drying methods, for example activators prepared by an oven dried process, the spray dried activator appeared to possess superior properties. Oven drying promotes significant loss of ammonia by thermal decomposition of ammonium phosphates and substantial hydrolysis of pyrophosphate to orthophosphate. Spray drying is a milder process and does not cause nearly as much ammonia loss or pyrophosphate hydrolysis. As a result, the initial composition of the activator slurry more closely matches the final spray dried activator than does the initial composition of the activator slurry match the final oven dried activator. It is desirable to have a process where the final composition of the activator is attained simply by adding those components together, without relying on chemical changes during drying which may or may not occur to the extent desired. This can be achievable with spray drying.

Various types of spray drying equipment can be used in the process of this invention. A Buchi Mini Spray Benchtop Spray Dryer and a Niro Mobile Miner Spray Dryer have been used. Typical spray drying conditions using the Niro Mobile Minor Spray Dryer are listed below.

TABLE

| TYPICAL SPRAY DRYING CONDITIONS | |
| --- | --- |
| Slurry Concentration: | ~29 Wt. % Solids |
| Inlet Temperature: | 150–160° C. |
| Outlet Temperature: | 85–95° C. |
| Air Pressure to Centrifugal Disk: | Full Open |
| Fan Baffle: | Full Open |
| Slurry Feed Rate Setting: | 3 |
| Yield Per Trial: | 130–160 grams |

The solid particulate activator prepared by the improved process of this invention can then be dry blended with a solid component comprising a magnesium-containing compound to yield a dry blend capable of forming a fast-setting cement at ambient temperatures when reacted with an aqueous component. The solid activator can optionally be further milled and classified prior to being dry blended. This activator material can usually have a particle size range of from 100–325 mesh and a surface area of from 0.1–10 $M^2/g$.

Generally, the fast-setting cement containing this activator can be used for producing fast-setting concrete structures, e.g., structures suitable for roadway construction and roadway patches or other load bearing uses. However in its broader aspects, this cement is generally applicable to preparing concrete structures with various characteristics, e.g., high or low strength, for a variety of other purposes as well. The characteristic of any particular concrete structure formed can depend upon the weight ratio of the various components, the nature of any aggregate employed, the temperature conditions of application and the curing conditions as well as other factors.

Fast-setting cement can be applied indoors or outdoors to concrete drives, storage yards, warehouse and factory floors to repair and restore damaged surfaces. Fast-setting cement can be used to fill structural cracks in slabs, and repair highway median barrier walls. This type of cement can be used in almost any situation requiring a quick, permanent repair of concrete. In addition, the fast-setting cement can be used for binding and coating metals and woods for structural and flame resistant applications.

The following experiments describe embodiments of the invention. Other embodiments will be apparent to one of ordinary skill in the art from a consideration of this specification or practice of the invention disclosed therein. It is intended that the specification and experiments be considered as exemplary only, with the true scope and spirit of the invention being indicated by the claims which follow the experiments.

EXPERIMENT 1

180 grams of ammonium phosphate fertilizer solution (type 10-34-0 Poly-N ® brand fertilizer supplied by Arcadian Corp.), 80 grams of diatomaceous earth, and 200 milliliters of water was slurried in a closed vessel. This slurry was heated to a temperature of 75° C. and maintained at that temperature for 48 hours.

The heated slurry was diluted with 400 milliliters of water and then spray dried with a Niro ® Mobile Minor Spray Dryer.

The spray drying conditions were as follows:
inlet temperature=155° C.
outlet temperature=95°-97° C.
air pressure=full open
fan baffle=full open
slurry feed rate setting=3

The experiment was discontinued when 95 grams of product had been collected.

The resulting activator collected via a cyclone in a collection jar as a fine powder.

This activator was used in a standard concrete test cylinder. 50 grams of spray dried activator, 6.7 grams hard burn magnesium oxide, 20 grams dead burn magnesium oxide, 100 grams coarse aggregate, 25 grams fine aggregate and 28.5 milliliters water were combined to form a test cylinder 2 inches in diameter.

The initial set time was 9.5 minutes with a maximum temperature of 79° C. The 2 hour compression strength of the test cylinder was 4393 psig.

EXPERIMENT 2

An activator of the composition in Experiment 1 was spray dried without the prior heat treatment. The product collected on the walls of the drying chamber as a uniform coating which was removed by a light brushing.

This activator was used in a standard concrete test cylinder. The composition used was the same as in Experiment 1, except that 29.5 milliliters of water was used.

The initial set time was 9.0 minutes with a maximum temperature of 53° C. The 2 hour compression strength of the test cylinder was 541 psig.

EXPERIMENT 3

180 grams Poly-N, 80 grams of diatomaceous earth and 200 milliliters of water were heated in a pressure reactor bottle at 100°-115° C. over 24 hours. The slurry was diluted with 400 milliliters of water and spray dried as in Experiment 1. 152 grams of product was collected. 100 grams activator, 200 grams coarse aggregate, 50 grams fine aggregate, 13.5 grams hard burn magnesium oxide, 40.5 grams dead burn magnesium oxide, and 53 milliliters water were combined to form a test cylinder 2 inches in diameter. The initial set time was 8.5 minutes and the 2 hour compression strength was 2343 psi.

What is claimed is:

1. A process for preparing a particulate solid activator comprising a porous material containing absorbed ammonium phosphate, said process comprises:
    (a) heating a slurry of the porous material and an ammonium phosphate solution from about 30° C. to about 120° C. for from about 6 hours to about 192 hours; and then
    (b) spraying drying solid slurry to obtain said particulate solid activator.

2. The process of claim 1 wherein the porous material is diatomaceous earth.

3. The process of claim 2 wherein the porous material comprises from about 30 to about 90 weight percent of the resulting solid activator.

* * * * *